US012018523B2

(12) United States Patent
Vander Bent, Jr. et al.

(10) Patent No.: US 12,018,523 B2
(45) Date of Patent: Jun. 25, 2024

(54) SLIDING DOOR ASSEMBLY WITH LOCKING PINS

(71) Applicant: PGT Innovations, Inc., North Venice, FL (US)

(72) Inventors: Kenneth John Vander Bent, Jr., Bradenton, FL (US); Kurt Karussi, Osprey, FL (US)

(73) Assignee: PGT Innovations, LLC, Harrisburg, PA (US)

(*) Notice: Subject to any disclaimer, the term of this patent is extended or adjusted under 35 U.S.C. 154(b) by 0 days.

(21) Appl. No.: 18/205,398

(22) Filed: Jun. 2, 2023

(65) Prior Publication Data

US 2023/0323718 A1 Oct. 12, 2023

Related U.S. Application Data

(63) Continuation of application No. 17/378,876, filed on Jul. 19, 2021, now Pat. No. 11,702,876, which is a (Continued)

(51) Int. Cl.
*E05D 15/58* (2006.01)
*E05D 15/06* (2006.01)

(Continued)

(52) U.S. Cl.
CPC ......... *E05D 15/58* (2013.01); *E05D 15/0652* (2013.01); *E05D 15/36* (2013.01);

(Continued)

(58) Field of Classification Search
CPC ..... E05D 15/36; E05D 15/58; E05D 15/0652; E05D 15/48; E05D 15/0604;

(Continued)

(56) References Cited

U.S. PATENT DOCUMENTS

| | | | |
|---|---|---|---|
| 3,002,218 | A | 10/1961 | McFerrell |
| 3,142,095 | A | 7/1964 | Sawyer |

(Continued)

FOREIGN PATENT DOCUMENTS

| | | |
|---|---|---|
| AU | 2003231726 | 3/2004 |
| AU | 2011286171 | 2/2012 |

(Continued)

OTHER PUBLICATIONS

USPTO, Office Action dated Jan. 11, 2021 in U.S. Appl. No. 16/227,605.

(Continued)

*Primary Examiner* — Justin B Rephann
(74) *Attorney, Agent, or Firm* — Snell & Wilmer L.L.P.

(57) ABSTRACT

A sliding door assembly includes an upper track assembly; a lower track assembly; a sliding door laterally slidable along each of the upper track assembly and the lower track assembly, the sliding door comprising a door body, an upper locking pin, and a lower locking pin, the sliding door configurable in a locked configuration and an unlocked configuration; and an actuator operatively connected to each of the upper locking pin and the lower locking pin; wherein, in the locked configuration, the actuator simultaneously engages the upper locking pin with the upper track assembly and the lower locking pin with the lower track assembly to prohibit the sliding door from opening, and in the unlocked configuration, the actuator simultaneously retracts the upper locking pin from the upper track assembly and the lower locking pin from the lower track assembly to allow the sliding door to open.

21 Claims, 4 Drawing Sheets

Related U.S. Application Data continuation of application No. 16/227,605, filed on Dec. 20, 2018, now Pat. No. 11,098,514.

(51) Int. Cl.
*E05D 15/36* (2006.01)
*E06B 3/50* (2006.01)

(52) U.S. Cl.
CPC .............. *E06B 3/50* (2013.01); *E06B 3/5072* (2013.01); *E06B 3/509* (2013.01); *E05Y 2900/132* (2013.01)

(58) Field of Classification Search
CPC ... E05D 2015/485; E06B 3/50; E06B 3/5072; E06B 3/509
See application file for complete search history.

(56) References Cited

U.S. PATENT DOCUMENTS

| | | | |
|---|---|---|---|
| 3,300,897 | A | 1/1967 | Wikkerink |
| 3,303,612 | A | 2/1967 | Baker |
| 3,464,159 | A | 9/1969 | Hewitt et al. |
| 3,654,732 | A | 4/1972 | Schacht |
| 3,722,028 | A | 3/1973 | Schoenbrod |
| 3,810,330 | A | 5/1974 | Daggy |
| 3,826,044 | A | 7/1974 | Armstrong |
| 3,925,933 | A | 12/1975 | Reuter |
| 3,957,101 | A | 5/1976 | Ippen et al. |
| 4,064,593 | A | 12/1977 | Helmick |
| 4,387,760 | A | 6/1983 | Greschbach |
| 4,438,594 | A | 3/1984 | Bunzl |
| 5,031,274 | A | 7/1991 | Eutebach |
| 5,217,262 | A | 6/1993 | Kurosaki |
| 5,273,328 | A | 12/1993 | Kurosaki |
| 5,394,648 | A | 3/1995 | Kordes |
| 5,486,026 | A | 1/1996 | Borgardt |
| 5,647,423 | A | 7/1997 | Harms |
| 5,749,172 | A | 5/1998 | Isopahkala |
| 5,984,381 | A | 11/1999 | Yamagishi |
| 5,997,056 | A | 12/1999 | Yamagishi |
| 6,422,287 | B1 | 7/2002 | Wilke |
| 6,618,994 | B1 | 9/2003 | Nussbaum |
| 6,834,703 | B2 | 12/2004 | Pacholke et al. |
| 6,955,205 | B2 | 10/2005 | Lewis |
| 7,861,475 | B2 | 1/2011 | Sprague |
| 8,381,443 | B2 | 2/2013 | Smith et al. |
| 8,443,549 | B2 | 5/2013 | Salvietti et al. |
| 8,756,865 | B2 | 6/2014 | Nicholson et al. |
| 8,806,807 | B2 | 8/2014 | Rees |
| 9,194,172 | B2 | 11/2015 | Rees |
| 9,745,787 | B2 | 8/2017 | Conley et al. |
| 10,280,678 | B1 | 5/2019 | Rendon, Jr. et al. |
| 10,415,289 | B2 | 9/2019 | Hailey et al. |
| 10,718,143 | B2 | 7/2020 | Tuminella et al. |
| 10,954,707 | B2 | 3/2021 | Hailey et al. |
| 11,098,511 | B2 | 8/2021 | Vander Bent, Jr. et al. |
| 11,098,514 | B2 | 8/2021 | Vander Bent, Jr. et al. |
| 11,603,694 | B2 | 3/2023 | Vander Bent, Jr. et al. |
| 2005/0284024 | A1 | 12/2005 | Bjorkman et al. |
| 2010/0243179 | A1 | 9/2010 | Burggraaf et al. |
| 2011/0094161 | A1 | 4/2011 | Rees |
| 2012/0073205 | A1 | 3/2012 | Hamaker et al. |
| 2014/0083013 | A1 | 3/2014 | Nicholson et al. |
| 2014/0150209 | A1 | 6/2014 | Tidwell |
| 2014/0352220 | A1 | 12/2014 | Rees |
| 2016/0251885 | A1 | 9/2016 | Conley et al. |
| 2017/0204646 | A1 | 7/2017 | Tomlinson et al. |
| 2019/0055768 | A1 | 2/2019 | Hailey et al. |
| 2019/0264484 | A1 | 8/2019 | Tuminella et al. |
| 2020/0199924 | A1 | 6/2020 | Vander Bent, Jr. et al. |
| 2020/0199925 | A1 | 6/2020 | Vander Bent, Jr. et al. |
| 2021/0340797 | A1 | 11/2021 | Vander Bent, Jr. et al. |
| 2021/0340800 | A1 | 11/2021 | Vander Bent, Jr. et al. |
| 2021/0340801 | A1 | 11/2021 | Vander Bent, Jr. et al. |

FOREIGN PATENT DOCUMENTS

| | | |
|---|---|---|
| AU | 2009200126 | 11/2015 |
| CH | 674544 | 6/1990 |
| CN | 106522766 | 3/2017 |
| EP | 1746234 | 1/2007 |
| EP | 3075938 | 10/2016 |
| GB | 2506968 | 4/2014 |
| GB | 2532795 | 6/2016 |
| KR | 20080053259 | 6/2008 |
| WO | 2009145641 | 12/2009 |
| WO | 2016003353 | 1/2016 |
| WO | 2016028713 | 2/2016 |

OTHER PUBLICATIONS

USPTO, Notice of Allowance dated Apr. 19, 2021 in U.S. Appl. No. 16/227,605.
USPTO, Corrected Notice of Allowance dated Jul. 22, 2021 in U.S. Appl. No. 16/227,605.
USPTO, Restriction Requirement dated Nov. 2, 2020 in U.S. Appl. No. 16/227,605.
USPTO, Notice of Allowance dated Mar. 6, 2023 in U.S. Appl. No. 17/378,876.
USPTO, Notice of Allowance dated Jun. 8, 2023 in U.S. Appl. No. 17/378,876.
USPTO, Office Action dated Sep. 13, 2022 in U.S. Appl. No. 17/378,876.
USPTO, Office Action dated Apr. 24, 2023 in U.S. Appl. No. 17/378,036.
USPTO, Notice of Allowance dated Dec. 7, 2022 in U.S. Appl. No. 17/378,895.
USPTO, Office Action dated Aug. 19, 2022 in U.S. Appl. No. 17/378,895.
Panoramic Doors UK; Article entitled: "Panoramic Doors Duyers Guide", accessed on Jun. 20, 2018, 16 pgs.
Warmcore; Brochure for Warmcore Folding Sliding Doors, located at <http://www.doorsandwindowsexeter.eo.uk/Llploads/8/1/9/8/8198075/warmcore_retail_brochure.pdf>, published on Nov. 28, 2017, 32 pgs_.
USPTO, Corrected Notice of Allowance dated Jul. 22, 2021 in U.S. Appl. No. 16/227,574.
USPTO, Office Action dated Jan. 8, 2021 in U.S. Appl. No. 16/227,574.
USPTO, Restriction Requirement dated Nov. 2, 2020 in U.S. Appl. No. 16/227,574.
USPTO, Notice of Allowance dated Apr. 19, 2021 in U.S. Appl. No. 16/227,574.

SLIDING DOOR ASSEMBLY WITH LOCKING PINS

CROSS REFERENCE TO RELATED APPLICATIONS

The present application is a continuation of U.S. application Ser. No. 17/378,876, filed Jul. 19, 2021, which is a continuation of U.S. application Ser. No. 16/227,605, filed Dec. 20, 2018, which issued as U.S. Pat. No. 11,098,514 on Aug. 24, 2021, each of which is hereby specifically incorporated by reference herein in its entirety.

TECHNICAL FIELD

This disclosure relates to sliding doors. More specifically, this disclosure relates to a sliding door system comprising a mono-track assembly.

BACKGROUND

Sliding door systems can comprise multiple sliding doors, and the sliding doors can stack together at varying depths to create an open space in the sliding door system. Typically, each sliding door requires its own upper track and lower track to slide along. As the quantity of sliding doors in a sliding door system increases, the quantity of upper and lower tracks required and the depth of the sliding door system can increase. As such, multi-door sliding door systems requiring a high quantity of upper and lower tracks can be expensive to manufacture and can occupy an inconvenient amount of space at the installation site.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a sliding door assembly comprising a track assembly defining a track surface and a slot; and a sliding door comprising a door body and a locking pin, the door body defining a left side and a right side opposite the left side, the locking pin proximate the right side, the locking pin removably engaging the slot, and the door body configured to pivot relative to the track assembly proximate the left side.

Also disclosed is a sliding door system comprising an upper track; a lower track; a first sliding door comprising a first upper locking pin, a first lower locking assembly, and a first pivot assembly, the first pivot assembly engaging the upper track and the lower track, the first upper locking pin removably engaging the upper track, and the first lower locking assembly removably engaging the lower track; and a second sliding door comprising a second upper locking pin, a second lower locking assembly, and a second pivot assembly, the second pivot assembly engaging the upper track and the lower track, the second upper locking pin removably engaging the upper track, and the second lower locking assembly removably engaging the lower track.

Also disclosed is a method for using a sliding door system, the method comprising providing a track assembly, the track comprising a track surface and a slot; providing a first sliding door, the first sliding door comprising a door body, a locking pin, and a pivot assembly, the locking pin removably engaging the slot; disengaging the locking pin from the slot; and pivoting the door body at the pivot assembly relative to the track assembly from a closed position to an open position.

Additionally, disclosed is a sliding door assembly comprising a track assembly defining a track surface and a slot; and a sliding door comprising a door body, a hinge rod, and a locking pin, each of the hinge rod and the locking pin extending from the door body and through the slot; wherein the sliding door is laterally slidable along the track assembly between a first position and a second position, and wherein each of the hinge rod and the locking pin slide laterally within the slot as the door slides between the first position and the second position.

Disclosed is a sliding door assembly comprising an upper track assembly defining an upper slot; a lower track assembly defining a lower track surface; a sliding door disposed between and slidable along the upper track assembly and the lower track assembly, the sliding door comprising a door body, an upper locking pin, and a lower locking pin, the upper locking pin extending from the door body and through the upper slot, the lower locking pin extending from the door body towards the lower track surface, the upper and lower locking pins simultaneously movable between a retracted configuration and an extended configuration; and a lower locking carriage movable along the lower track surface, the lower locking pin engaging the lower locking carriage.

Also disclosed is a sliding door assembly comprising a track assembly defining a track surface; a locking carriage movable along the track surface; and a sliding door slidable along the track assembly, the sliding door comprising a door body, a locking pin, and a recess, the locking pin extending from the door body towards the track assembly and engaging the locking carriage; wherein the locking pin movable between an extended configuration, wherein the locking carriage engages the track surface, and a retracted configuration, wherein the locking carriage disengages the track surface and is at least partially received in the recess of the sliding door.

Furthermore, disclosed is a sliding door assembly comprising a track assembly defining a track surface; a sliding door comprising a door body; and a track engagement device extending from the sliding door and laterally movable along the track surface, the track engagement device extending around a side of the track assembly and engaging the track surface.

Also disclosed is a sliding door assembly comprising an upper track assembly; a lower track assembly; a sliding door laterally slidable along each of the upper track assembly and the lower track assembly, the sliding door comprising a door body, an upper locking pin, and a lower locking pin, the sliding door configurable in a locked configuration and an unlocked configuration; and an actuator operatively connected to each of the upper locking pin and the lower locking pin; wherein, in the locked configuration, the actuator simultaneously engages the upper locking pin with the upper track assembly and the lower locking pin with the lower track assembly to prohibit the sliding door from opening, and in the unlocked configuration, the actuator simultaneously retracts the upper locking pin from the upper track assembly and the lower locking pin from the lower track assembly to allow the sliding door to open.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
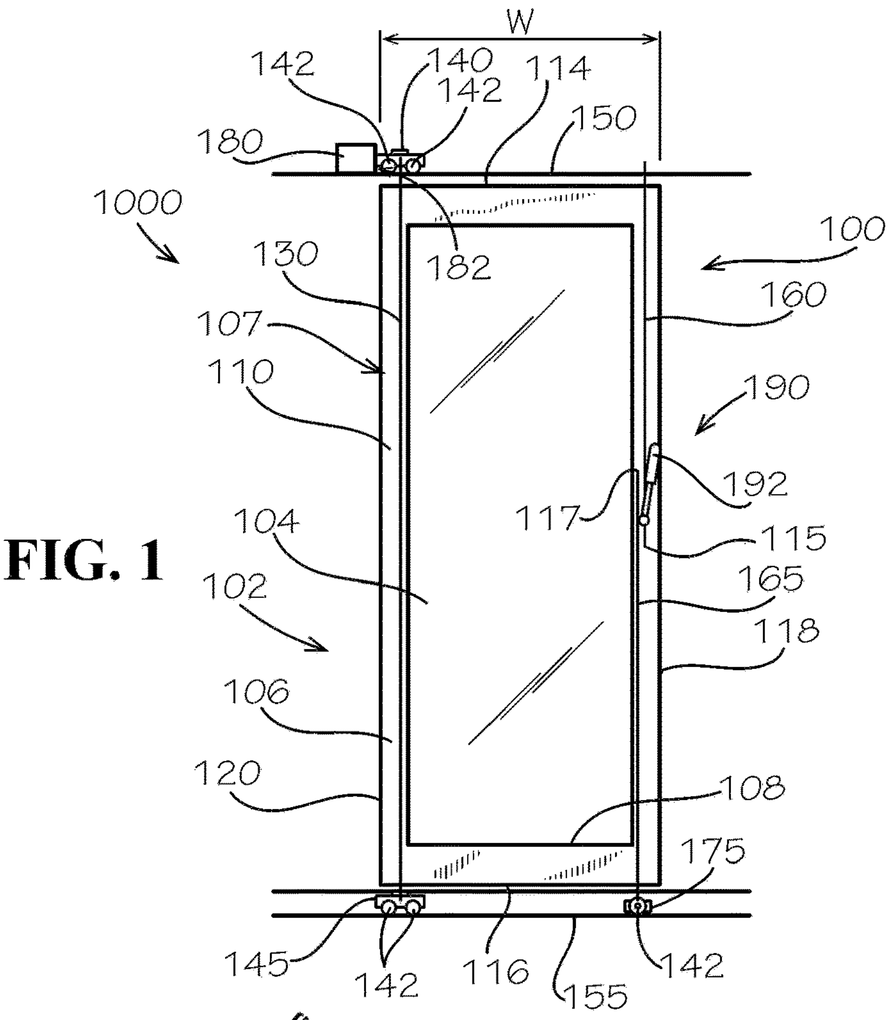
FIG. 1 is a front view of a sliding door, in accordance with one aspect of the present disclosure, wherein a door frame of the sliding door is illustrated as transparent.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a sliding door system and associated methods, systems, devices, and various apparatus. Example aspects of the sliding door system can comprise a plurality of sliding doors, a mono-track upper track assembly, and a mono-track lower track assembly. It would be understood by one of skill in the art that the disclosed sliding door system is described in but a few exemplary aspects among many. No particular terminology or description should be considered limiting on the disclosure or the scope of any claims issuing therefrom.

FIG. 1 illustrates a first aspect of a sliding door assembly 1000 comprising a sliding door 100, according to the present disclosure. According to the present aspect, the sliding door 100 can define a door body 102. Example aspects of the door body 102 can comprise a window panel 104 and a door frame 106, as shown. In the present FIG. 1, the door frame 106 is illustrated as transparent for visibility into interior components, which will be described below. Example aspects of the door frame 106 can define an opening 108 extending from a front side 110 of the sliding door 100 to a back side 212 (shown in FIG. 2) of the sliding door 100. As shown, the window panel 104 can be received within the opening 108. Example aspects of the window panel 104 can be formed from a glass material to allow for visibility through the window panel 104. Furthermore, example aspects of the door frame 106 can be formed from a wood material. However, in other aspects, the window panel 104 and/or the door frame 106 can be formed from a number of other suitable materials or combination thereof, including, but not limited to, metals, plastics, composite materials, and the like. Furthermore, in other aspects, the sliding door 100 may not comprise the window panel 104, and in still other aspects, the sliding door 100 can comprise multiple window panels 104.

Example aspects of the window panel 104 can define a substantially rectangular shape and the door frame 106 can define a substantially rectangular shape, as shown. In other aspects, the window panel 104 and/or the door frame 106 can define any other suitable shape. Furthermore, in other aspects, the window panel 104 and door frame 106 can each define a different shape. For example, in one aspect, the window panel 104 can define an oval shape and the door frame 106 can define a rectangular shape.

As shown, the sliding door 100 can define a top end 114, a bottom end 116, a right side 118, and a left side 120, relative to the orientation shown. Furthermore, a width W of the sliding door 100 can be defined extending from the right side 118 of the sliding door 100 to the left side 120 of the sliding door. Example aspects of the sliding door 100 can comprise a pivot assembly 107. In the present aspect, the pivot assembly 107 can comprise a pivot mechanism, such as a hinge rod 130. In other aspects, the pivot mechanism can comprise a bearing or any other suitable mechanism known in the art that can allow for pivotal movement. As shown, the hinge rod 130 can extend in a substantially vertically, relative to the orientation shown, through a hinge channel 238 (shown in FIG. 2) formed in the door frame 106. In example aspects, the hinge rod 130 and hinge channel 238 can extend from the top end 114 of the sliding door 100 to the bottom end 116, and can be oriented proximate to the left side 120 of the sliding door 100. Other aspects of the hinge rod 130 can be oriented proximate the right side 118 of the sliding door 100. The pivot assembly 107 can allow the door body 102 of the sliding door 100 to pivot about the hinge rod 130, or other pivot mechanism, between a closed position, as shown, and an open position, which will be described in further detail below.

According to example aspects, the pivot assembly 107 can comprise an upper hinge carriage 140 and a lower hinge carriage 145. As shown, the hinge rod 130 can extend beyond the top and bottom ends 114, 116 of the sliding door 100. An upper end 232 (shown in FIG. 2) of the hinge rod 130 can engage the upper hinge carriage 140 and a lower end (not shown) of the hinge rod 130 can engage the lower hinge carriage 145. Example aspects of the sliding door assembly 1000 can further comprise an upper track assembly 150 and a lower track assembly 155. As shown, the upper hinge carriage 140 can comprise one or more wheels 142 for rolling along the upper track assembly 150, and the lower hinge carriage 145 can comprise one or more wheels 142 for rolling along the lower track assembly 155, as will be described in further detail below. Furthermore, according to example aspects, the upper track assembly 150 and/or lower track assembly 155 can comprise one or more stop blocks 180. Each of the stop blocks 180 can define a stop surface 182 for limiting the movement of the upper and lower hinge carriages 140,145. In other aspects, any other suitable movement mechanism known in the art for rolling sliding, gliding, or otherwise moving the upper and lower hinge carriages 140,145 along the upper track assembly 150 and lower track assembly 155, respectively, can be used. Furthermore, in other aspects of the sliding door 100, the door body 102 can be fixed relative to the hinge rod 130, and the hinge rod 130 and door body 102 can pivot relative to the upper hinge carriage 140 and lower hinge carriage 145. Also, according to other aspects, the hinge rod 130 can be separated into an upper hinge rod and a lower hinge rod that is separate from the upper hinge rod.

The sliding door 100 can also comprise an upper locking pin 160 and a lower locking pin 165. In example aspects, each of the upper and lower locking pins 160,165 can extend in a substantially vertical direction, relative to the orientation shown. The upper locking pin 160 can extend through an upper locking channel 364 (shown in FIG. 3A) formed in the door frame 106, and the lower locking hinge can extend through a lower locking channel (not shown) formed in the door frame 106. As shown, in example aspects, each of the upper and lower locking pins 160,165 can be oriented proximate the right side 118 of the sliding door 100, opposite the hinge rod 130. In other aspects, the positioning of the upper and lower locking pins 160,165 and the hinge rod 130 can be switched. Furthermore, as illustrated, in example aspects, the upper locking channel 364 can be horizontally offset from the lower locking channel, relative to the orientation shown. The upper locking channel 364 can extend in a generally downward vertical direction, relative to the orientation shown, from the top end 114 of the sliding door 100 to a first intermediate point 115. The lower locking channel (not shown) can extend in a generally upward vertical direction, relative to the orientation shown, from the bottom end 116 of the sliding door 100 to a second intermediate point 117. Each of the first intermediate point and second intermediate point can be defined a point between the top end 114 and the bottom end 116 of the sliding door 100. In other aspects, the upper locking channel 364 and/or lower locking channel (not shown) can extend through the door frame 106 from the top end 114 to the bottom end 116. According to example aspects, the upper and lower locking pins 160, 165 can be configured to slide within the upper locking channel 364 and lower locking channel, respectively.

According to example aspects, the upper locking pin 160 can extend beyond the top end 114 of the sliding door 100 and can be configured to removably engage the upper track assembly 150. The lower locking pin 165 can extend beyond the bottom end 116 of the sliding door 100 and can be configured to engage a lower locking carriage 175. As shown, the lower locking carriage 175 can comprise one or more wheels 142 for rolling along the lower track assembly 155.

According to example aspects, the upper locking pin 160 can be selectively movable between an extended configuration, as shown, wherein the upper locking pin 160 can engage with the upper track assembly 150, and a retracted configuration (shown in FIG. 5), wherein the upper locking pin 160 can disengage from the upper track assembly 150. Furthermore, the lower locking pin 165 can be selectively movable between an extended configuration, as shown, wherein the lower locking carriage 175 can engage the lower track assembly 155, and a retracted configuration (shown in FIG. 4B), wherein the lower locking carriage 175 can disengage the lower track assembly 155.

The sliding door 100 can further comprise an actuator 190, such as the handle 192 depicted in the current aspect, for selectively actuating the upper and lower locking pins 160,165 between the extended configuration and the retracted configuration. As shown in FIG. 1, the handle 192 can be operably attached to each of the upper and lower locking pins 160,165. In one example aspect, the handle 192 can be pivotable between a raised orientation, as shown, and a lowered orientation, as shown in FIG. 5. In the raised orientation, the handle 192 can push the upper locking pin 160 into engagement with the upper track assembly 150 and can push the lower locking carriage 175 into engagement with the lower track assembly 155. In the lowered orientation, the handle 192 can retract the upper locking pin 160 from the upper track assembly 150 and can retract the lower locking pin 165 and lower locking carriage 175 from the lower track assembly 155. The actuator 190 can be user accessible such that a user can selectively move the upper and lower locking pins 160,165 between the extended and retracted configurations, as desired. The extended configuration and retracted configurations are described in further detail below with respect to FIGS. 3A, 4A, and 4B.

Figure 2:
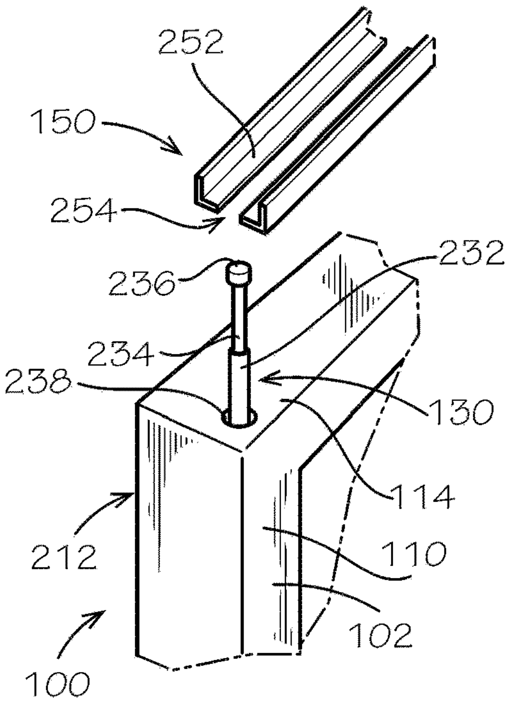
FIG. 2 is a top perspective view of a hinge rod of the sliding door of FIG. 1 and an upper track assembly.

FIG. 2 illustrates a close-up perspective view of the hinge rod 130 and hinge channel 238 at the top end 114 of the sliding door 100. The hinge rod 130 can define a substantially cylindrical shape and the hinge channel 238 can define a substantially cylindrical shape. However, in other aspects, the hinge rod 130 and/or hinge channel 238 can define any other suitable shape that can allow the door body 102 to pivot about the hinge rod 130. FIG. 2 also illustrates the upper track assembly 150, according to an aspect of the present disclosure. As shown, the upper track assembly 150 can extend about parallel along its length to the top end 114 of the sliding door 100 and can be positioned proximate to the same. Example aspects of the upper track assembly 150 can define an upper track surface 252 for supporting the upper hinge carriage 140 and an upper slot 254 extending centrally along a length thereof.

According to example aspects, the hinge rod 130 can be substantially aligned with the upper slot 254 of the upper track assembly 150. Furthermore, the upper end 232 of the hinge rod 130 can define a neck 234 and a cap 236, as shown. Example aspects of the neck 234 can define a width smaller than a width of the upper slot 254, such that the neck 234 can extend through the upper slot 254 and can be configured to slide within the upper slot 254. Example aspects of the cap 236 can define a width greater than the width of the upper slot 254, such that the cap 236 cannot pass through the upper slot 254, thereby retaining the hinge rod 130 in engagement with the upper slot 254. Moreover, the cap 236 at the upper end 232 of the hinge rod 130 can engage the upper hinge carriage 140 (shown in FIG. 1). The lower end (not shown) of the hinge rod 130 can engage the lower hinge carriage 145 (shown in FIG. 1) in substantially the same manner. Example aspects of the upper hinge carriage 140 can roll along the upper track surface 252 of the upper track assembly 150 to facilitate sliding movement of the sliding door 100. Example aspects of the upper slot 254 can guide the hinge rod 130 as the upper hinge carriage 140 rolls along the upper track surface 252.

Figure 3A:
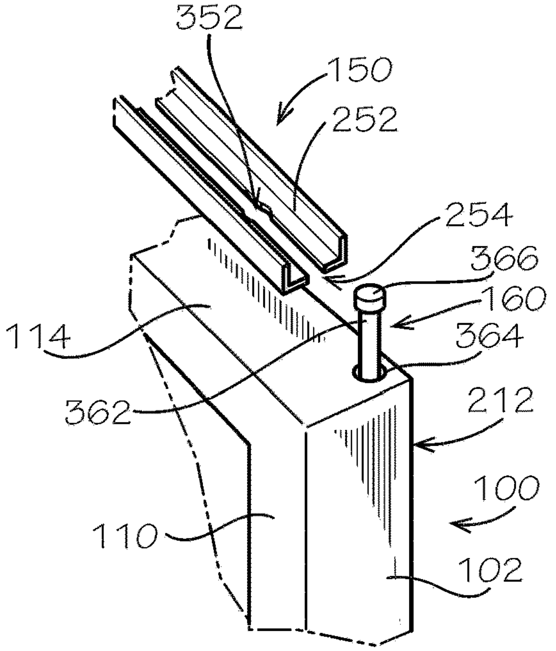
FIG. 3A is a top perspective view of an upper locking pin of the sliding door of FIG. 1 and the upper track assembly of FIG. 2.

FIG. 3A illustrates a close-up perspective view of the upper locking pin 160 and upper locking channel 364 at the top end 114 of the sliding door 100. As shown, in example aspects, the upper locking pin 160 can define a substantially cylindrical shape and the upper locking channel 364 can define a substantially cylindrical shape; however, in other aspects, the upper locking pin 160 and upper locking channel 364 can define any other suitable shape. According to example aspects, the lower locking pin 165 (shown in FIG. 1) and lower locking channel (not shown) can be substantially the same as the upper locking pin 160 and upper locking channel 364.

According to example aspects, the upper locking pin 160 can also be substantially aligned with the upper slot 254 of the upper track assembly 150. In example aspects, a head 366 can be positioned at a distal end 362 of the upper locking pin 160, as shown. According to example aspects, the head 366 can define a width greater than a width of the upper locking pin 160. Furthermore, as shown, example aspects of the upper track assembly 150 can define one or more holes 352 formed in the upper track surface 252 and intersecting the upper slot 254. The holes 352 can be spaced apart along the upper track surface 252, as shown. Furthermore, example aspects of the holes 352 can define a width greater than a width of the upper slot 254, as illustrated.

Figure 5:
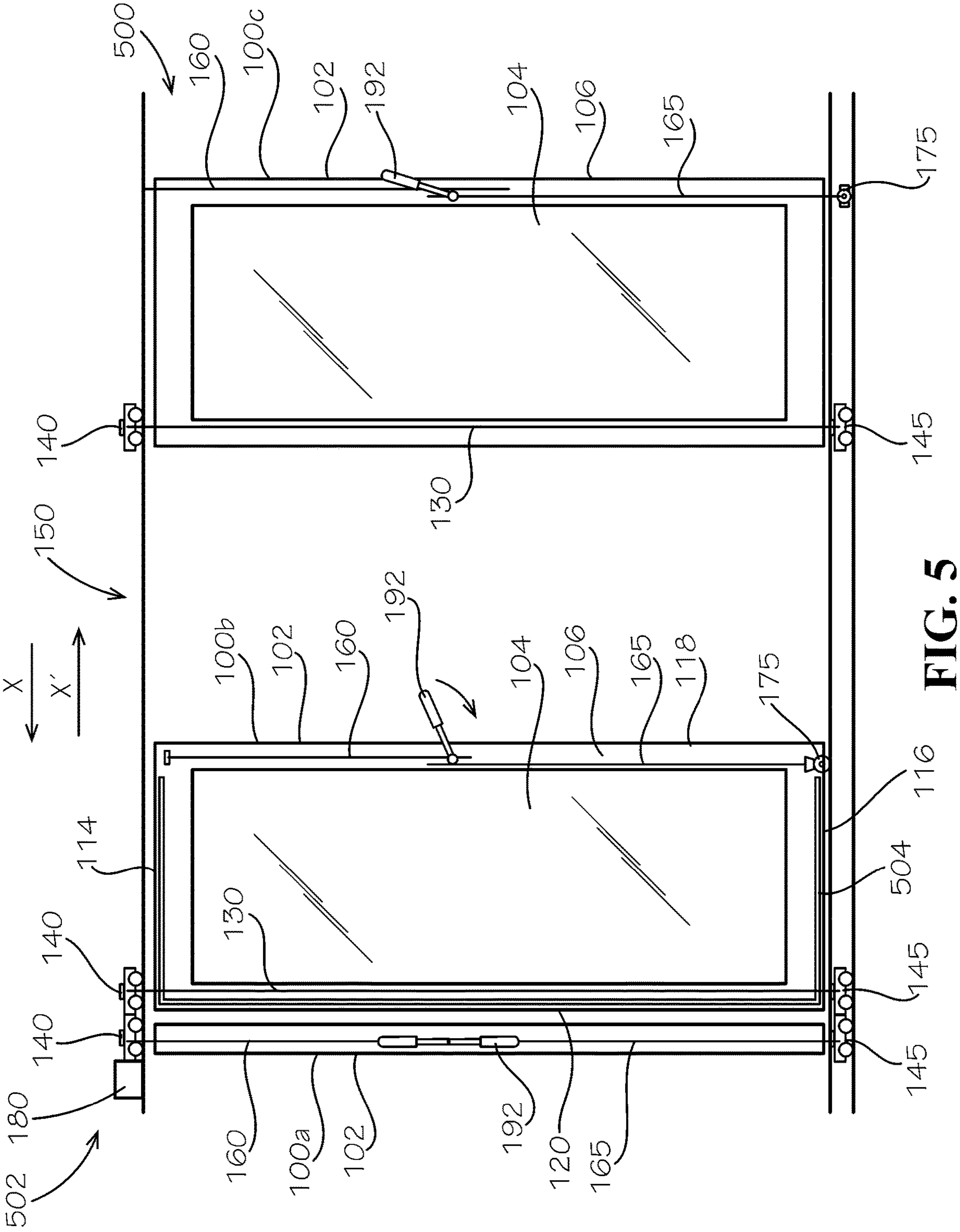
FIG. 5 is front view of a sliding door system, in accordance with one aspect of the present disclosure.

According to example aspects, the width of the upper locking pin 160 can be smaller than the width of the upper slot 254, such that the upper locking pin 160 can extend through the upper slot 254 and can be configured to slide within the upper slot 254. Moreover, in example aspects, the width of the head 366 can be greater than the width of the upper slot 254, such that the head 366 cannot pass through the upper slot 254, thereby retaining the upper locking pin 160 in engagement with the upper slot 254. The upper locking pin 160 thereby cannot disengage the upper slot 254 when the head 366 is not aligned with the hole 352. However, according to example aspects, the width of the head 366 can be smaller than the width of the holes 352, such that the head 366 can be configured to engage and disengage the upper slot 254 when aligned with one of the holes 352. As such, when the head 366 and hole 352 are aligned, the handle 192 (shown in FIG. 1) can be actuated to move the upper locking pin 160 between the extended and retracted configurations. When the upper locking pin 160 is in the retracted configuration, the upper locking pin 160 and head 366 can be retracted from the upper slot 254, such that the upper locking pin 160 and head 366 can clear the upper track assembly 150. With both the upper locking pin 160 and lower locking pin 165 (shown in FIG. 1) are in the retracted configuration, the door body 102 can pivot about the hinge rod 130 (shown in FIG. 1), as will be described in further detail below with reference to FIGS. 5-6.

Figure 3B:
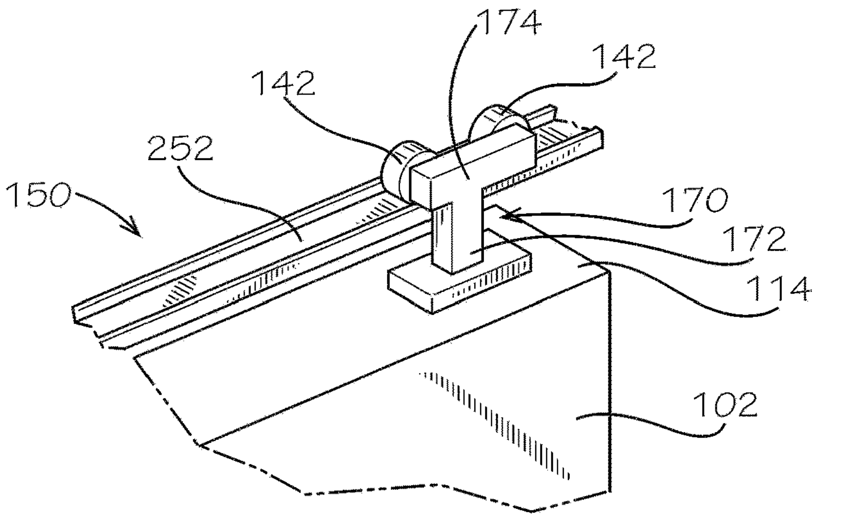
FIG. 3B is top perspective view of the sliding door of FIG. 1 and the upper track assembly of FIG. 2, according to another aspect of the present disclosure.

FIG. 3B illustrates another example aspect, wherein the upper locking pin 160 can be replaced with a track engagement device 170. The track engagement device 170 can extend beyond the top end 114 of the door body 102, and can be configured to removably engage the upper track assembly 150. Example aspects of the track engagement device 170 can comprise a leg member 172 extending substantially vertically upward from the door frame 102, relative to the orientation shown. An arm member 174 of the track engagement device 170 can extend in a substantially horizontal direction, relative to the orientation shown, at a distal end of the leg member 172. As such, the leg member 172 and arm member 174 can generally define a T-shaped track engagement device 170. According to example aspects, one or more wheels 142 can be connected to the arm member 174. The wheels 142 can be configured to engage the upper track surface 252 of the upper track assembly 150 to facilitate rolling along the upper track surface 252.

The track engagement device 170 can be selectively movable between an engaged configuration, as shown, wherein the track engagement device 170 can engage the upper track assembly 150, and a disengaged configuration, wherein the track engagement device 170 can be disengaged from the upper track assembly 150. For example, in the disengaged configured, the track engagement device 170 can be extended further away from the door body 102, such that the arm member 172 and wheels 142 can be elevated above and can clear the upper track assembly 150, such as by raising the track engagement device 170 relative to the upper track assembly 150. In example aspects, the actuator 190 (shown in FIG. 1) can be configured to actuate the track engagement device 170 between the engaged configured and disengaged orientation and to actuate the lower locking pin 165 between the extended configuration and the retracted configuration simultaneously. With the track engagement device 170 in the disengaged configuration and the lower locking pin 165 in the retracted configuration, the door body 102 can pivot about the hinge rod 130 (shown in FIG. 1). In example aspects, in the disengaged configuration, the leg member of the track engagement device can abut a side of the upper track assembly 150, such that the door body 102 can pivot away from the upper track assembly 150 but cannot pivot past the upper track assembly 150.

Figure 4A:
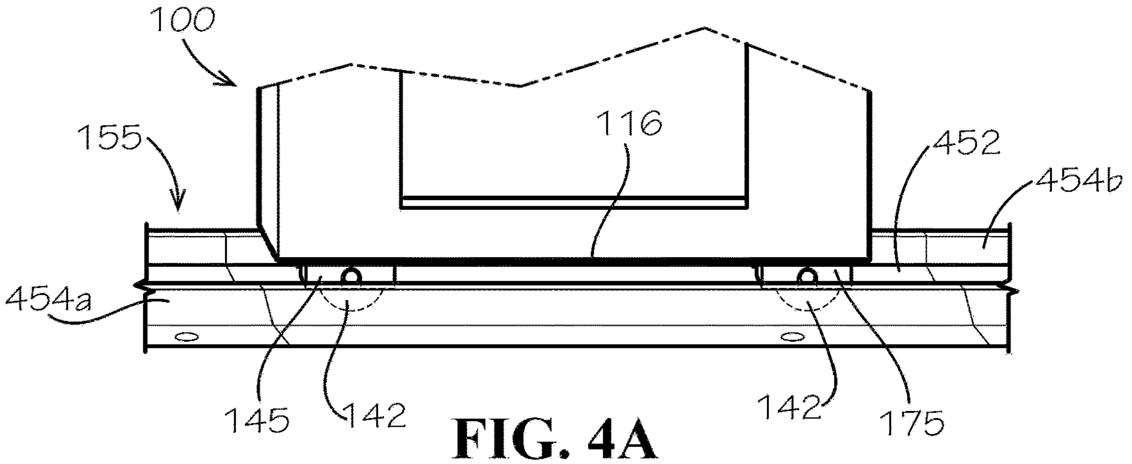
FIG. 4A is a top perspective view of a lower hinge carriage and lower locking carriage of the sliding door of FIG. 1 engaged with a lower track assembly, wherein the lower track assembly is illustrated as transparent.

FIG. 4A illustrates a close-up view of the lower track assembly 155 and the bottom end 116 of the sliding door 100. In example aspects, the lower track assembly 155 can be situated on a support surface (e.g., a ground, a floor, etc.). In some aspects, the lower track assembly 155 can be recessed into the ground to provide a smooth floor transition from one side of the door 100 to the other. As shown, example aspects of the lower track assembly 155 can comprise a lower track surface 452 for supporting the lower hinge carriage 145 and the lower locking carriage 175. As described above, each of the lower hinge carriage 145 and lower locking carriage 175 can comprise one or more wheels 142 to facilitate rolling along the lower track surface 452. For visibility of the lower hinge carriage 145 and lower locking carriage 175, the lower track assembly 155 is illustrated as transparent in FIG. 5.

According to example aspects, the lower track assembly 155 can further comprise a pair of opposing sidewalls 454*a,b* positioned on either side of the lower track surface 452 and extending upwardly therefrom, relative to the orientation shown. As shown, each of the lower locking carriage 175 and lower hinge carriage 145 can be received therebetween. In example aspects, the lower end (not shown) of the hinge rod 130 (shown in FIG. 1) can be configured substantially the same as the upper end 232 (shown in FIG. 2) of the hinge rod 130, described above with respect to FIG. 2. The lower end of the hinge rod 130 can also engage the lower hinge carriage 145 in substantially the same manner that upper end 232 engages the upper hinge carriage 140 (shown in FIG. 1). Furthermore, the lower locking pin 165 (shown in FIG. 1) can be configured substantially the same as the upper locking pin 160 (shown in FIG. 1) described above with reference to FIG. 3A. However, in example aspects, the lower locking pin 165 (shown in FIG. 1) can be fixedly secured to the lower locking carriage 175. According to example aspects, the sidewalls 454*a,b* can guide the lower hinge carriage 145 and lower locking carriage 175 as each rolls along the lower track surface 452 of the lower track assembly 155.

Figure 4B:
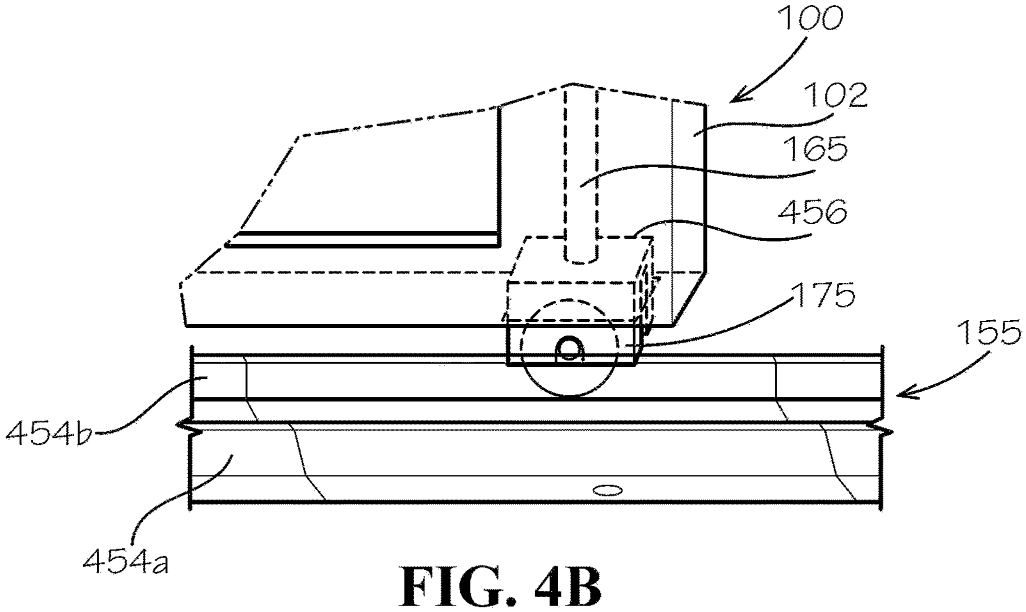
FIG. 4B is a top perspective view of the lower locking carriage of FIG. 4 disengaged from the lower track assembly of FIG. 4.

FIG. 4B illustrates the lower locking pin 165 in the retracted configuration. In the present FIG. 4B, the door frame 106 is illustrated as transparent for visibility of interior components. According to example aspects, the lower locking pin 165 can be operatively coupled to the lower locking carriage 175, such that the lower locking carriage 175 can move along with the lower locking pin 165 as the lower locking pin 165 is extended and retracted by the actuator 190 (shown in FIG. 1). In the retracted configuration, the lower locking pin 165 and lower locking carriage 175 can be retracted from the lower track assembly 155, such that the lower locking carriage 175 can clear the sidewalls 454*a,b* of the lower track assembly 155. In some aspects, the lower locking carriage 175, or a portion thereof, can be housed in a recess 456 formed in the door frame 106 in the retracted configuration, as shown. When both the lower locking pin 165 and upper locking pin 160 (shown in FIG. 1) are in the retracted configuration, the door body 102 can pivot about the hinge rod 130 (shown in FIG. 1), as will be described in further detail below with reference to FIGS. 5, 6A, and 6B.

FIG. 5 illustrates an aspect of a sliding door system 500, according to the present disclosure. As shown, the sliding door system 500 can comprise a plurality of the sliding doors 100. For example, the sliding door system 500 can comprise a first sliding door 100*a*, a second sliding door 100*b*, and a third sliding door 100*c*, each of which can be substantially similar to the sliding door 100 of FIGS. 1-3A, 4A, and 4B. Other aspects of the sliding door system 500 can comprise more or fewer sliding doors 100. Each of the sliding doors 100*a,b,c* can comprise the door body 102. The door body 102 can comprise the window panel 104 and the surrounding door frame 106. Furthermore, each of the sliding doors 100*a,b,c* can comprise the hinge rod 130 and the upper and lower hinge carriages 140,145 connected thereto. Each of the sliding doors 100*a,b,c* can also comprise the upper locking pin 160 removably engagable with the upper track assembly 150 and the lower locking pin 165 connected to the lower locking carriage 175, which can be removably engagable with the lower track assembly 155. Each of the upper hinge carriages 140 can roll along the upper track surface 252 (shown in FIG. 2) of the upper track assembly 150, and each of the lower hinge carriages 145 and lower locking carriages 175 can roll along the lower track surface 452 (shown in FIG. 4A) of the lower track assembly 155.

As such, regardless of the quantity of sliding doors 100 in the sliding door system 500, the upper track assembly 150 requires no more than one track (e.g. the upper track surface 252) for supporting the upper hinge carriages 140 and for removably engaging the upper locking pins 160. Similarly, the lower track assembly 155 requires no more than one track (e.g., the lower track surface 452) for supporting the lower hinge carriages 145 and lower locking carriages 175.

Referring to the second sliding door 100*b*, according to example aspects, some or all of the sliding doors 100*a,b,c* can comprise a reinforcement member 504. The reinforcement member 504 can be formed from a metal material, such as steel in some aspects. In other aspects, the reinforcement member 504 can be formed from another suitable material, including, but not limited to, other types of metal, such as iron, plastic, concrete, wood, and composite materials. In the depicted aspect, the reinforcement member 504 can be housed within the door frame 106; however, in other aspects the reinforcement member 504 can be positioned outside of the door frame 106. As shown, in example aspects, the reinforcement member 504 can substantially define a C-shape and can extend proximate to the top end 114, left side 120, and bottom end 116 of the second sliding door 100*b*. Example aspects of the reinforcement member 504 can aid in preventing the second sliding door 100*b* from leaning when a manual force is applied to the handle 192 to move the handle 192 to the lowered position. The reinforcement member 504 can further aid in preventing the second sliding door 100*b* from leaning when the second sliding door 100*b* is in the open position, wherein the right side 118 of the second sliding door 100*b* is unsupported.

The present FIG. 5 illustrates the first sliding door 100*a* in an open position and the second and third sliding door 100*b*,100*c* in a closed positioned. Referring to the third sliding door 100*c*, in the closed position, as shown, each of the upper and lower locking pins 160,165 can be in the extended configuration, wherein the upper locking pin 160 can be pushed upward, relative to the orientation shown, to removably engage the upper track assembly 150, and wherein the lower locking pin 165 can be pushed downward to engage the lower locking carriage 175 with the lower track assembly 155. The door body 102 can be prevented from pivoting about the hinge rod 130 by the interference of upper locking pin 160 with the upper track assembly 150 and by the interference of the lower locking carriage 175 with the lower track assembly 155.

Referring to the second sliding door 100*b*, a method for moving the sliding door 100*b* from the closed position to the open position can comprise moving each of the upper and lower locking pins 160,165 to the retracted configuration. Moving the upper and lower locking pins 160,165 from the extended configuration to the retracted configuration can comprise actuating the actuator 190 (such as the handle 192) to retract the upper locking pin 160 from the upper track assembly 150 and to retract the lower locking pin 165 and lower locking carriage 175 from the lower track assembly 155. In example aspects, actuating the handle 192 can comprise moving the handle 192 from the raised orientation to the lowered orientation, as illustrated. In the retracted position, the upper locking pin 160 and the lower locking carriage 175 can clear the upper track assembly 150 and lower track assembly 155, respectively, such that the door body 102 is free to pivot about the hinge rod 130 from the closed position to the open position, and vice versa. The first sliding door 100*a* is illustrated in the open position.

Figure 6A:
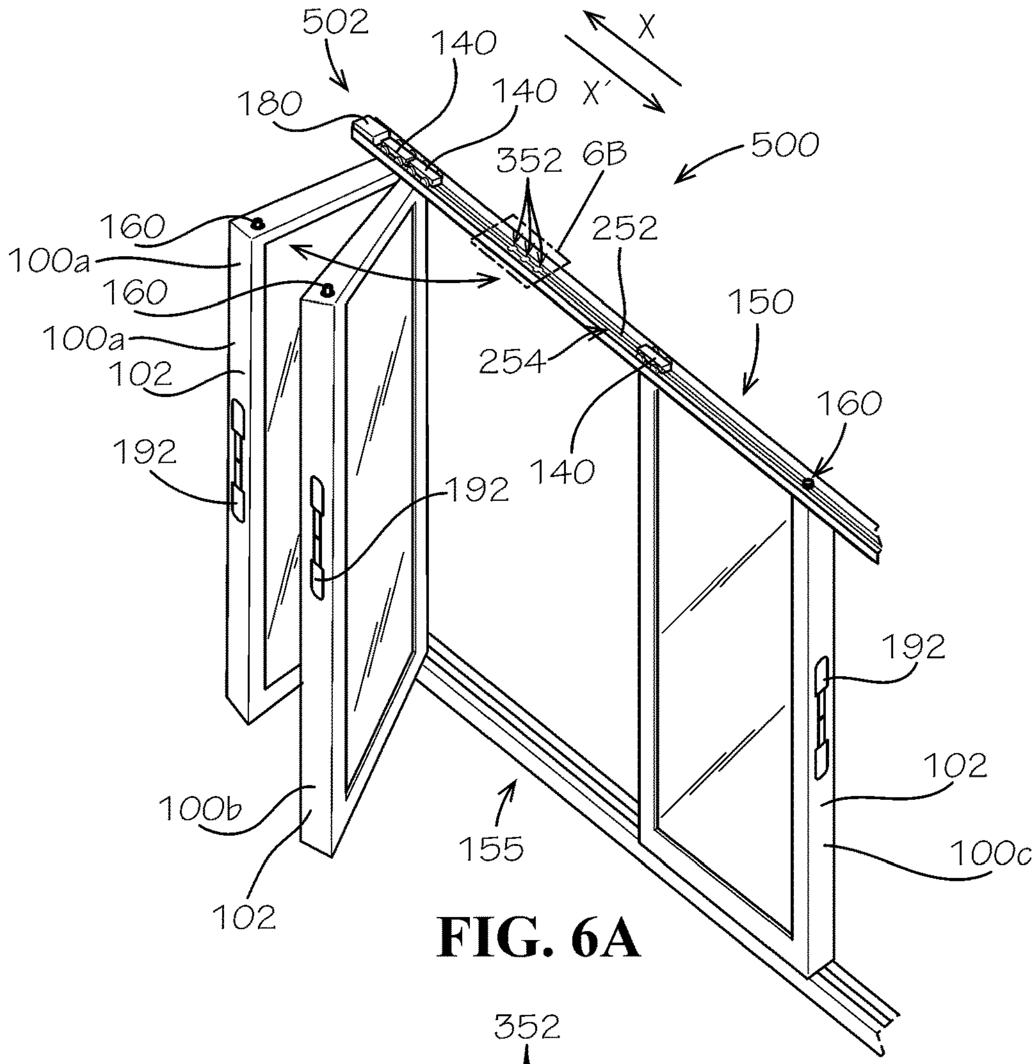
FIG. 6A is a top perspective view of the sliding door system of FIG. 5.
Figure 6B:
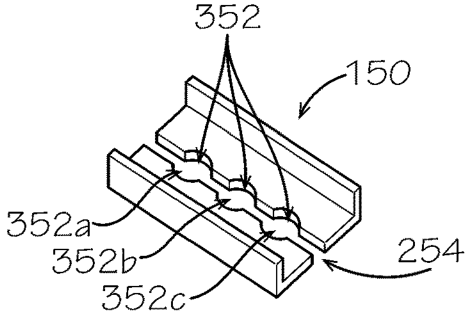
FIG. 6B is a detail view of Section 6B of FIG. 6A.

Furthermore, the plurality of sliding doors 100*a,b,c* can be slid along the upper and lower track assemblies 150,155 to be stacked in the open position at or near a side of the sliding door system 500. For example, in the depicted aspect, the sliding doors 100*a,b,c* can be slid in the general direction X towards a left side 502 of the sliding door system 500, relative to the orientation shown in FIG. 5. As shown in FIG. 6A, the first sliding door 100*a* can be slid in the direction X towards the left side 502, and the stop block 180 located on the upper track surface 252 of the upper track assembly 150 can aid in properly locating the corresponding upper hinge carriage 140 and can prevent the upper hinge carriage 140 from further movement in the X direction. In some example aspects, the sliding door system 500 can also include a stop block 180 (not shown) on the lower track surface 452 for limiting the movement of the corresponding lower hinge carriage 145 (shown in FIG. 5). The upper and lower locking pins 160, 165 (lower locking pins 165 shown in FIG. 5) can then be actuated to the retracted configuration. For example, the upper locking pin 160 of the first sliding door 100*a* can be aligned with hole 352*a* (shown in FIG. 6B) and then moved to the retracted configuration. With the upper and lower locking pins 160,165 in the retracted configuration, the door body 102 of the first sliding door 100*a* can pivot about the corresponding hinge rod 130 (shown in FIG. 5) to an open position, as shown.

In some aspects, one or more connection mechanisms (not shown) can be provided for prohibiting movement of the upper hinge carriage 140 of the first sliding door 100*a* in an opposite direction X' to further prevent movement of the upper hinge carriage 140 along the upper track assembly 150 while the first sliding door 100*a* is in the open position. For example, in one aspect, magnets can be provided for releasably connecting the upper hinge carriage 140 to the adjacent stop block 180. The connection mechanism can be released by a user, as desired, by applying a sufficient manual force to overcome the magnetic force. In another aspect, the upper hinge carriage 140 can be prevented from moving in the X' direction by a small ridge (not shown) formed on the upper track surface 252. The upper hinge carriage 140 can be pushed over the ridge by manually applying a suitable force. In still other aspects, the connection mechanism can define a different construction. Furthermore, in some aspects, a connection mechanism can also be provided for limiting the movement of the lower hinge carriage 145 in the direction X'.

As further shown in FIG. 6A, the second sliding door 100*b* can also slide towards the left side 502 of the sliding door system 500 to stack with the first sliding door 100*a*. With the first sliding door 100*a* in the open position, the upper hinge carriage 140 of the second sliding door 100*b* can be slid along the upper track surface 252 to abut the upper hinge carriage 140 of the first sliding door 100*a*. Similarly, the lower hinge carriage 145 (shown in FIG. 5) of the second sliding door 100*b* can be slid along the lower track surface 452 to abut the lower hinge carriage 145 (shown in FIG. 5) of the first sliding door 100*a*.

According to example aspects, the upper track assembly 150 can be configured such that the upper locking pin 160 and the head 366 of the second sliding door 100*b* can align with one of the holes 352*b* (shown in FIG. 6B) of the upper track assembly 150 when the second sliding door 100*b* is stacked with the first sliding door 100*a*. With the upper locking pin 160 aligned with the hole 352*b*, the upper and lower locking pins 160,165 can be moved to the retracted configuration, as described above. In this configuration, the door body 102 of the second sliding door 100*b* can pivot about the corresponding hinge rod 130 (shown in FIG. 5) to the open position, as described above with reference to the first sliding door 100*a*. As such, in some aspects, the second sliding door 100*b* can be moved from the closed position to the open position only when the second sliding door 100*b* is stacked with the first sliding door 100*a* and the upper locking pin 160 comes into alignment with the corresponding hole 352*b*. The third sliding door 100*c*, and any additional sliding doors 100, can be slid in the same manner to stack with the first and second sliding door 100*a*,100*b*. When stacked with the first and second sliding doors 100*a*, 100*b*, the upper locking pin 160 of the third sliding door 100*c* can align with another one of the holes 352*c* (shown in FIG. 6B) and can be pivoted from the closed position to the open position. Furthermore, in example aspects, adjacent upper and lower hinge carriages 140,145 can be releasably connected, as described in further detail below with respect to FIGS. 7A and 7B.

Figure 7A:
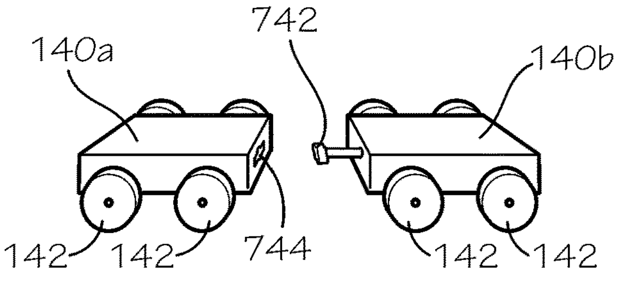
FIG. 7A is a top perspective view of a first upper hinge carriage of a first one of the sliding doors of FIG. 1 disengaged from a second upper hinge carriage of a second one of the sliding doors of FIG. 1.
Figure 7B:
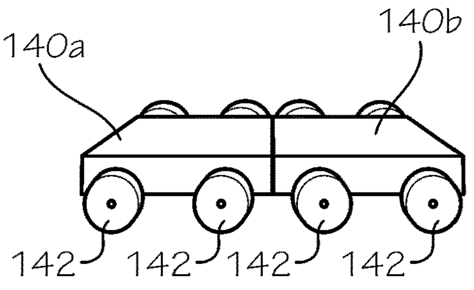
FIG. 7B is a top perspective view of the first upper hinge carriage of FIG. 7A engaged with the second upper hinge carriage of FIG. 7A.

FIG. 7A illustrates the a pair of the upper hinge carriages 140*a,b* in an unconnected configuration, and FIG. 7B illustrates the pair of upper hinge carriages 140*a,b* in a connected configuration. As shown in FIG. 7A, in one aspect, the upper hinge carriage 140*a* can define a recess 744, and the upper hinge carriage 140*b* can define a key 742 for removably engaging the recess 744. According to example aspects, as shown in FIG. 7B, the upper hinge carriage 140*b* can slide towards the upper hinge carriage 140*a* until the key 742 engages the recess 744. The connection of the key 742 and recess 744 can connect the upper hinge carriages 140*a,b* together, for example, by a friction force. To disconnect the upper hinge carriages 140*a,b*, a suitable force (e.g., a manual force) can be applied to overcome the friction force. In other aspects, the adjacent upper hinge carriages 140*a,b* can be connected by other suitable connecting mechanisms known in the art; for example, the upper hinge carriages 140*a,b* can be releasably connected by magnets. To disconnect the upper hinges 140*a,b* from one another, a suitable force can be applied to overcome the magnetic force. Furthermore, in some aspects, each adjacent pair of the lower hinge carriages 145 can be releasably connected in a substantially similar manner.

As such, a method for using the sliding door system 500 can comprise providing the upper track assembly 150, wherein the upper track assembly 150 comprises the upper track surface 252 and the upper slot 254, providing the sliding door 100, wherein the sliding door 100 comprises the door body 102, the hinge rod 130, and the upper locking pin 160, and wherein the hinge rod 130 extends through the upper slot 254 to engage the upper track assembly 150 and the upper locking pin 160 removably extends through the upper slot 254 to removably engage the upper track assembly, disengaging the upper locking pin 160 from the upper track assembly 150; and pivoting the door body 102 about the hinge rod 130 from a closed position to an open position. In some aspects, the sliding door system 500 can further comprise an upper hinge carriage 140 connected to the hinge rod 130, and the method can further comprise sliding the upper hinge carriage 140 along the upper track surface 252 of the upper track assembly 150 to a desired location.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A sliding door assembly comprising:

an upper track assembly defining a slot extending substantially along a length of the upper track assembly, the upper track assembly further defines a hole intersecting the slot;

a lower track assembly;

a sliding door laterally slidable along each of the upper track assembly and the lower track assembly, the sliding door comprising a door body, an upper locking pin, and a lower locking pin, the sliding door configurable in a locked configuration and an unlocked configuration, the upper locking pin is configured to engage the slot in the locked configuration and disengage the slot in the unlocked configuration; and an actuator operatively connected to each of the upper locking pin and the lower locking pin;

wherein, in the locked configuration, the actuator simultaneously engages the upper locking pin with the upper track assembly and the lower locking pin with the lower track assembly to prohibit the sliding door from opening, and in the unlocked configuration, the actuator simultaneously retracts the upper locking pin from the upper track assembly and the lower locking pin from the lower track assembly to allow the sliding door to open;

the upper locking pin defines a cap, the cap defines a width that is greater than a width of the slot and less than a width of the hole; and the cap passes through the hole as the upper locking pin is retracted from the upper track assembly.

2. The sliding door assembly of claim 1, wherein:

the sliding door further comprises a hinge rod;

the door body is pivotable at the hinge rod between an open position and a closed position in the unlocked configuration; and the door body is prohibited from pivoting between the open position and the closed position in the locked configuration.

3. The sliding door assembly of claim 2, wherein:

the door body defines a first side and a second side opposite the first side;

the hinge rod engages the door body proximate to the first side; and the upper locking pin and the lower locking pin engage the door body proximate to the second side.

4. The sliding door assembly of claim 3, further comprising a lower hinge carriage movable along a lower track surface of the lower track assembly, and wherein the hinge rod is coupled to the lower hinge carriage at a lower rod end of the hinge rod.

5. The sliding door assembly of claim 4, wherein the lower track assembly comprises a lower stop block, and wherein the lower stop block is configured to engage the lower hinge carriage to limit movement of the lower hinge carriage along the lower track surface.

6. The sliding door assembly of claim 3, further comprising an upper hinge carriage movable along an upper track surface of the upper track assembly, and wherein the hinge rod is coupled to the upper hinge carriage at an upper rod end of the hinge rod.

7. The sliding door assembly of claim 6, wherein the upper track assembly comprises an upper stop block, and wherein the upper stop block is configured to engage the upper hinge carriage to limit movement of the upper hinge carriage along the upper track surface.

8. The sliding door assembly of claim 1, wherein:
- the lower track assembly defines a lower track surface;
- the sliding door assembly further comprises a lower locking carriage movable along the lower track surface in the locked configuration; and
- the lower locking carriage disengages the lower track surface in the unlocked configuration.

9. The sliding door assembly of claim 8, wherein:
- the lower track assembly defines a sidewall extending along a side of the lower track surface;
- the door body defines a recess; and
- in the unlocked configuration, the lower locking carriage vertically clears the sidewall and is at least partially received within the recess.

10. The sliding door assembly of claim 8, wherein the lower locking carriage comprises a lower wheel configured to roll along the lower track surface.

11. The sliding door assembly of claim 8, wherein:
- the upper track assembly defines an upper track surface;
- the slot extends substantially along the upper track surface;
- the sliding door assembly further comprises an upper locking carriage movable along the upper track surface; and
- the upper locking pin engages the upper locking carriage in the locked configuration and disengages the upper locking carriage in the unlocked configuration.

12. The sliding door assembly of claim 11, wherein the upper locking carriage comprises an upper wheel configured to roll along the upper track surface.

13. The sliding door assembly of claim 1, wherein:
- the upper locking pin defines a proximal upper pin end and a distal upper pin end;
- the lower locking pin defines a proximal lower pin end and a distal lower pin end;
- the distal upper pin end engages the upper track assembly and the distal lower pin end engages the lower track assembly; and
- the actuator is operatively coupled to the upper locking pin proximate to the proximal upper pin end and to the lower locking pin proximate to the proximal lower pin end.

14. The sliding door assembly of claim 13, wherein each of the proximal upper pin end and the proximal lower pin end is disposed within the door body of the sliding door.

15. The sliding door assembly of claim 14, wherein the actuator is a manually-operable handle movable between a first orientation, wherein the sliding door is in the locked configuration, and a second orientation, wherein the sliding door is in the unlocked configuration.

16. The sliding door assembly of claim 15, wherein the first orientation is a raised orientation and the second orientation is a lowered orientation.

17. A sliding door assembly comprising:
- an upper track assembly defining a slot extending substantially along a length of the upper track assembly;
- a lower track assembly defining a lower track surface and a sidewall extending along a side of the lower track surface;
- a sliding door laterally slidable along each of the upper track assembly and the lower track assembly, the sliding door comprising a door body, an upper locking pin, and a lower locking pin, the sliding door configurable in a locked configuration and an unlocked configuration, the upper locking pin is configured to engage the slot in the locked configuration and disengage the slot in the unlocked configuration, and the door body defines a recess;
- a lower locking carriage movable along the lower track surface in the locked configuration, the lower locking carriage is configured to disengage the lower track surface in the unlocked configuration, and, in the unlocked configuration, the lower locking carriage vertically clears the sidewall and is at least partially received within the recess; and
- an actuator operatively connected to each of the upper locking pin and the lower locking pin;
- wherein, in the locked configuration, the actuator simultaneously engages the upper locking pin with the upper track assembly and the lower locking pin with the lower track assembly to prohibit the sliding door from opening, and in the unlocked configuration, the actuator simultaneously retracts the upper locking pin from the upper track assembly and the lower locking pin from the lower track assembly to allow the sliding door to open.

18. A sliding door assembly comprising:
- an upper track assembly defining an upper track surface and a slot extending substantially along a length of the upper track surface;
- a lower track assembly defining a lower track surface;
- a sliding door laterally slidable along each of the upper track assembly and the lower track assembly, the sliding door comprising a door body, an upper locking pin, and a lower locking pin, the sliding door configurable in a locked configuration and an unlocked configuration, and the upper locking pin is configured to engage the slot in the locked configuration and disengage the slot in the unlocked configuration;
- a lower locking carriage movable along the lower track surface in the locked configuration, the lower locking carriage is configured to disengage the lower track surface in the unlocked configuration;
- an upper locking carriage movable along the upper track surface, the upper locking pin is configured to engage the upper locking carriage in the locked configuration and disengage the upper locking carriage in the unlocked configuration; and
- an actuator operatively connected to each of the upper locking pin and the lower locking pin;
- wherein, in the locked configuration, the actuator simultaneously engages the upper locking pin with the upper track assembly and the lower locking pin with the lower track assembly to prohibit the sliding door from opening, and in the unlocked configuration, the actuator simultaneously retracts the upper locking pin from the upper track assembly and the lower locking pin from the lower track assembly to allow the sliding door to open.

19. The sliding door assembly of claim 18, wherein the upper locking carriage comprises an upper wheel configured to roll along the upper track surface.

20. A sliding door assembly comprising:

an upper track assembly defining a slot extending substantially along a length of the upper track assembly, the upper track assembly further defines a hole intersecting the slot;

a sliding door laterally slidable along the upper track assembly, the sliding door comprising a door body and an upper locking pin, the door body includes a hinge side and a swing side, the upper locking pin is located on the swing side of the door, the door body is configured to pivot relative to the upper track assembly proximate the hinge side and the swing side of the door body is configured to swing away from the upper track assembly as the door body pivots relative to the upper track assembly, the sliding door configurable in a locked configuration and an unlocked configuration, the upper locking pin is configured to engage the slot in the locked configuration and disengage the slot in the unlocked configuration; and wherein, in the locked configuration, the upper locking pin engages with the upper track assembly to prohibit the sliding door from opening, and in the unlocked configuration, the upper locking pin disengages from the upper track assembly to allow the sliding door to open, and the upper locking pin passes through the hole as the upper locking pin is retracted from the upper track assembly.

21. The sliding door assembly of claim 20, wherein, with the upper locking pin engaged with the slot in the locked configuration, the sliding door is laterally slidable along the upper track assembly between a first position and a second position; and in the first position, the upper locking pin is aligned with the hole, and the door body is pivotable between an open position and a closed position in the unlocked configuration; and in the second position, the upper locking pin is offset from the hole, and the door body is prohibited from pivoting between the open position and the closed position in the locked configuration.

* * * * *